US009858154B1

(12) United States Patent
Lyadvinsky et al.

(10) Patent No.: US 9,858,154 B1
(45) Date of Patent: Jan. 2, 2018

(54) AGENTLESS FILE BACKUP OF A VIRTUAL MACHINE

(71) Applicants: Maxim V. Lyadvinsky, Moscow (RU); Serguei M. Beloussov, Costa del Sol (SG); Vladimir Miroshkin, Moscow (RU); Victor Shulga, Moscow (RU)

(72) Inventors: Maxim V. Lyadvinsky, Moscow (RU); Serguei M. Beloussov, Costa del Sol (SG); Vladimir Miroshkin, Moscow (RU); Victor Shulga, Moscow (RU)

(73) Assignee: Acronis International GmbH (CH)

(*) Notice: Subject to any disclaimer, the term of this patent is extended or adjusted under 35 U.S.C. 154(b) by 199 days.

(21) Appl. No.: 14/320,526

(22) Filed: Jun. 30, 2014

Related U.S. Application Data

(60) Provisional application No. 61/869,467, filed on Aug. 23, 2013, provisional application No. 61/869,470, filed on Aug. 23, 2013, provisional application No. 61/869,480, filed on Aug. 23, 2013.

(51) Int. Cl.
G06F 17/30 (2006.01)
G06F 11/14 (2006.01)

(52) U.S. Cl.
CPC ...... G06F 11/1451 (2013.01); G06F 11/1435 (2013.01); G06F 2201/84 (2013.01)

(58) Field of Classification Search
CPC ............. G06F 11/1448; G06F 11/1464; G06F 11/1456; G06F 11/1466; G06F 11/1469; G06F 2201/815; G06F 2201/84; G06F 11/1435; H04L 67/1097; G04F 11/1451
See application file for complete search history.

(56) References Cited

U.S. PATENT DOCUMENTS

| 7,047,380 | B2 | 5/2006 | Tormasov et al. |
| 7,246,211 | B1 | 7/2007 | Beloussov et al. |
| 7,275,139 | B1 | 9/2007 | Tormasov et al. |
| 7,281,104 | B1 | 10/2007 | Tsypliaev et al. |
| 7,318,135 | B1 | 1/2008 | Tormasov et al. |
| 7,353,355 | B1 | 4/2008 | Tormasov et al. |
| 7,366,859 | B2 | 4/2008 | Per et al. |
| 7,383,327 | B1 * | 6/2008 | Tormasov ............ H04L 41/082 709/220 |
| 7,475,282 | B2 | 1/2009 | Tormasov et al. |
| 7,603,533 | B1 | 10/2009 | Tsypliaev et al. |
| 7,636,824 | B1 | 12/2009 | Tormasov |
| 7,650,473 | B1 | 1/2010 | Tormasov et al. |
| 7,721,138 | B1 * | 5/2010 | Lyadvinsky ........ G06F 11/1417 714/10 |

(Continued)

Primary Examiner — Anh Ly
(74) Attorney, Agent, or Firm — K&L Gates LLP

(57) ABSTRACT

A method, computer program product, computing system, and system for virtual machine backup are described. In part, the disclosure relates to methods and systems for performing backup of virtual machine files on a block level that include features that allow a user to select and backup specific files or folders of file systems of a VM. The specificity and selectivity features by which certain files or folders are backup from a file system of a VM can be implemented by processing one or more partition structures of a virtual disk of a virtual machine. Once the partition structures have been processed and analyzed using a backup up software application, it is then possible to detect and process guest file systems of the VM.

18 Claims, 5 Drawing Sheets

(56) References Cited

U.S. PATENT DOCUMENTS

| | | |
|---|---|---|
| 7,779,221 B1 | 8/2010 | Tormasov et al. |
| 7,831,789 B1 | 11/2010 | Tsypliaev et al. |
| 7,886,120 B1 | 2/2011 | Tormasov |
| 7,895,403 B1 | 2/2011 | Tormasov et al. |
| 7,934,064 B1 | 4/2011 | Per et al. |
| 7,937,612 B1 | 5/2011 | Tormasov et al. |
| 7,949,635 B1 | 5/2011 | Korshunov et al. |
| 7,953,948 B1 | 5/2011 | Dyatlov et al. |
| 7,979,690 B1 | 7/2011 | Dyatlov et al. |
| 8,005,797 B1 * | 8/2011 | Chepel ............... G06F 11/1451 707/649 |
| 8,051,044 B1 | 11/2011 | Dyatlov et al. |
| 8,069,320 B1 | 11/2011 | Per et al. |
| 8,073,815 B1 | 12/2011 | Korshunov et al. |
| 8,074,035 B1 | 12/2011 | Per et al. |
| 8,145,607 B1 | 3/2012 | Korshunov et al. |
| 8,180,984 B1 | 5/2012 | Per et al. |
| 8,225,133 B1 | 7/2012 | Tormasov et al. |
| 8,261,035 B1 | 9/2012 | Tormasov et al. |
| 8,296,264 B1 | 10/2012 | Yeresov et al. |
| 8,312,259 B1 | 11/2012 | Dyatlov et al. |
| 8,347,137 B1 | 1/2013 | Chepel et al. |
| 8,484,427 B1 | 7/2013 | Lyadvinsky et al. |
| 8,645,748 B1 | 2/2014 | Chepel et al. |
| 8,732,121 B1 | 5/2014 | Zorin et al. |
| 8,856,927 B1 | 10/2014 | Beloussov et al. |
| 8,996,468 B1 * | 3/2015 | Mattox ............... G06F 11/14 707/650 |
| 8,996,830 B1 | 3/2015 | Lyadvinsky et al. |
| 9,092,625 B1 * | 7/2015 | Kashyap ............ G06F 21/566 707/E17.004 |
| 2005/0198303 A1 * | 9/2005 | Knauerhase ......... G06F 9/5055 709/227 |
| 2006/0225065 A1 | 10/2006 | Chandhok et al. |
| 2008/0033902 A1 * | 2/2008 | Glaizel ............ G06F 17/30079 707/E17.01 |
| 2008/0307175 A1 * | 12/2008 | Hart ................... G06F 11/1461 711/162 |
| 2010/0011178 A1 * | 1/2010 | Feathergill ......... G06F 11/1466 711/162 |
| 2010/0228913 A1 * | 9/2010 | Czezatke ........... G06F 11/1451 711/112 |
| 2011/0047340 A1 * | 2/2011 | Olson ................ G06F 11/1456 711/162 |
| 2011/0066597 A1 * | 3/2011 | Mashtizadeh ........ G06F 3/0617 707/640 |
| 2012/0054746 A1 * | 3/2012 | Vaghani ............... G06F 9/5022 718/1 |
| 2012/0102135 A1 * | 4/2012 | Srinivasan ......... G06F 9/45558 709/213 |
| 2014/0297941 A1 * | 10/2014 | Rajani ................. G06F 3/0644 711/114 |
| 2014/0351810 A1 * | 11/2014 | Pratt .................. G06F 9/45545 718/1 |

* cited by examiner

AGENTLESS FILE BACKUP OF A VIRTUAL MACHINE

CROSS REFERENCE TO PRIOR APPLICATIONS

This application claims priority to and the benefit of U.S. Provisional Patent Application No. 61/869,470, filed on Aug. 23, 2013; U.S. Provisional Patent Application 61/869,467, filed on Aug. 23, 2013; and U.S. Provisional Patent Application No. 61/869,480, filed on Aug. 23, 2013, the entire contents of each of which are hereby incorporated by reference. This application is related to, and hereby incorporates by reference in their entireties, the following co-owned patent applications filed on even date herewith by Applicant Acronis International GmBh: United States Patent Application entitled "Configuring Backup and Recovery Routines in a Cloud Environment" and having Ser. No. 14/320,393, filed on Jun. 30, 2014; United States Patent Application entitled "Using A Storage Path To Facilitate Disaster Recovery" and having Ser. No. 14/320,409, filed on Jun. 30, 2014; United States Patent Application entitled "Granular Recovery Using Hot-Plug Virtual Disks" and having Ser. No. 14/320,422, filed on Jun. 30, 2014; United States Patent Application entitled "Hot Recovery of Virtual Machines" and having Ser. No. 14/320,450, filed on Jun. 30, 2014; United States Patent Application entitled "Snapshotless Backup" and having Ser. No. 14/320,496, filed on Jun. 30, 2014; United States Patent Application entitled "Recovery of Virtual Machine Files Using Disk Attachment" and having Ser. No. 14/320,510, filed on Jun. 30, 2014; United States Patent Application entitled "Machine Replication" and having Ser. No. 14/320,540, filed on Jun. 30, 2014; United States Patent Application entitled "Data Backup Parallelization" and having Ser. No. 14/320,546, filed on Jun. 30, 2014; and United States Patent Application entitled "Systems and Methods for Backup of Virtual Machines" and having Ser. No. 14/320,555, filed on Jun. 30, 2014.

TECHNICAL FIELD

The technical field may generally relate to cloud computing, and more particularly to backup of virtual machines in a cloud environment.

BACKGROUND

Various business critical applications may be run on virtual machines and thus it may be critical to create backups of such virtual machines in case a failure or loss of data occurs. Backing up a virtual machine may consume resources on the virtual machine, may cause the virtual machine to run slower, and may affect services supported by the virtual machine. For example, during some backup processes, write requests to the virtual machine being backed up may need to be written to a separate file and may use up valuable resources on the virtual machine. Accordingly, reducing the use of resources in a virtual machine during backup processes may be a primary goal in various business contexts.

BRIEF SUMMARY

In an embodiment, the disclosure relates to an agentless backup process such that a backup agent is not installed inside this virtual machine (in guest OS), but instead blocks corresponding to user identified files and directories of the VM undergoing a backup are identified and migrated to a data repository. The entire contents of the VM are not backed up to the archive, but rather each file, directory, or other user specified data in the VM are archived based on a user's selections in a user interface.

In an embodiment, the disclosure relates to method that may include creating a snapshot of a virtual machine hosted at a virtual machine server; opening, from the created snapshot, one or more disks of the virtual machine, the one or more disks including files selected for backup; identifying, based upon, at least in part, file system metadata associated with the one or more disks, one or more blocks of the one or more disks, the one or more blocks corresponding to the files selected for backup; storing the one or more blocks and metadata corresponding to the one or more blocks in a backup repository; and closing the one or more disks of the virtual machine and removing the snapshot.

In an embodiment, the method may include identifying one or more file systems associated with the files selected for backup based upon, at least in part, one or more file system partition structures of the one or more disks of the virtual machine. In an embodiment, the method may include receiving an indication of the files selected for backup. In an embodiment, the method may include establishing communication between the virtual machine server hosting the virtual machine and a separate computing device running a backup agent configured to perform the creating, opening, identifying, storing, and closing operations.

In an embodiment, the method may include recovering the files selected for backup to the virtual machine by, at least in part, copying the one or more blocks from the backup repository to the virtual machine using an application programming interface. In an embodiment, the method may include recovering the files selected for backup by, at least in part, recovering the one or more blocks from the backup repository to a user specified location accessible to the virtual machine.

In an embodiment, the method may include recovering the files selected for backup to the virtual machine using, at least in part, a file driver configured to save data to the one or more disks of the virtual machine. In an embodiment, the files selected for backup include user critical data comprising a portion of the one or more disks of the virtual machine. In an embodiment, the files selected for backup exclude non-critical data from the one or more disks of the virtual machine, the non-critical data including at least one of operating system files, application files, and temporary files.

In an embodiment, a system may include a virtual machine hosted at a virtual machine server and a backup system. The backup system may be configured to create a snapshot of a virtual machine hosted at a virtual machine server; open, from the created snapshot, one or more disks of the virtual machine, the one or more disks including files selected for backup; identify, based upon, at least in part, file system metadata associated with the one or more disks, one or more blocks of the one or more disks, the one or more blocks corresponding to the files selected for backup; store the one or more blocks and metadata corresponding to the one or more blocks in a backup repository; and close the one or more disks of the virtual machine and removing the snapshot.

In one embodiment, the backup system is further configured to identify one or more file systems associated with the files selected for backup based upon, at least in part, one or more file system partition structures of the one or more disks of the virtual machine. In one embodiment, the backup system is further configured to receive an indication of the files selected for backup. In one embodiment, the backup system is a backup agent configured to establish communication between the virtual machine server hosting the virtual machine and a separate computing device running the backup agent. In one embodiment, the backup system is further configured to recover the files selected for backup to the virtual machine by, at least in part, copying the one or more blocks from the backup repository to the virtual machine using an application programming interface.

In one embodiment, the backup system is further configured to recover the files selected for backup by, at least in part, recovering the one or more blocks from the backup repository to a user specified location accessible to the virtual machine. In one embodiment, the backup system is further configured to recover the files selected for backup to the virtual machine using, at least in part, a file driver configured to save data to the one or more disks of the virtual machine. In one embodiment, files selected for backup include user critical data comprising a portion of the one or more disks of the virtual machine. In one embodiment, the files selected for backup exclude non-critical data from the one or more disks of the virtual machine, the non-critical data including at least one of operating system files, application files, and temporary files.

In an embodiment, a system may include a virtual machine hosted at a virtual machine server; a snapshot system that creates a snapshot of the virtual machine; a backup agent running at a computing device separate from the virtual machine server. The backup agent opens, from the created snapshot, one or more disks of the virtual machine, the one or more disks including files selected for backup; identifies, based upon, at least in part, file system metadata associated with the one or more disks, one or more blocks of the one or more disks, the one or more blocks corresponding to the files selected for backup; and closes the one or more disks of the virtual machine and removes the snapshot; and a backup repository that stores the one or more blocks and metadata corresponding to the one or more blocks.

In one embodiment, agentless backup refers to backing up data of a virtual machine without installing a backup agent inside this virtual machine (in guest OS).

The details of one or more implementations are set forth in the accompanying drawings and the description below. Other features and advantages will become apparent from the description, the drawings, and the claims.

DETAILED DESCRIPTION

Overview

Figure 1A:
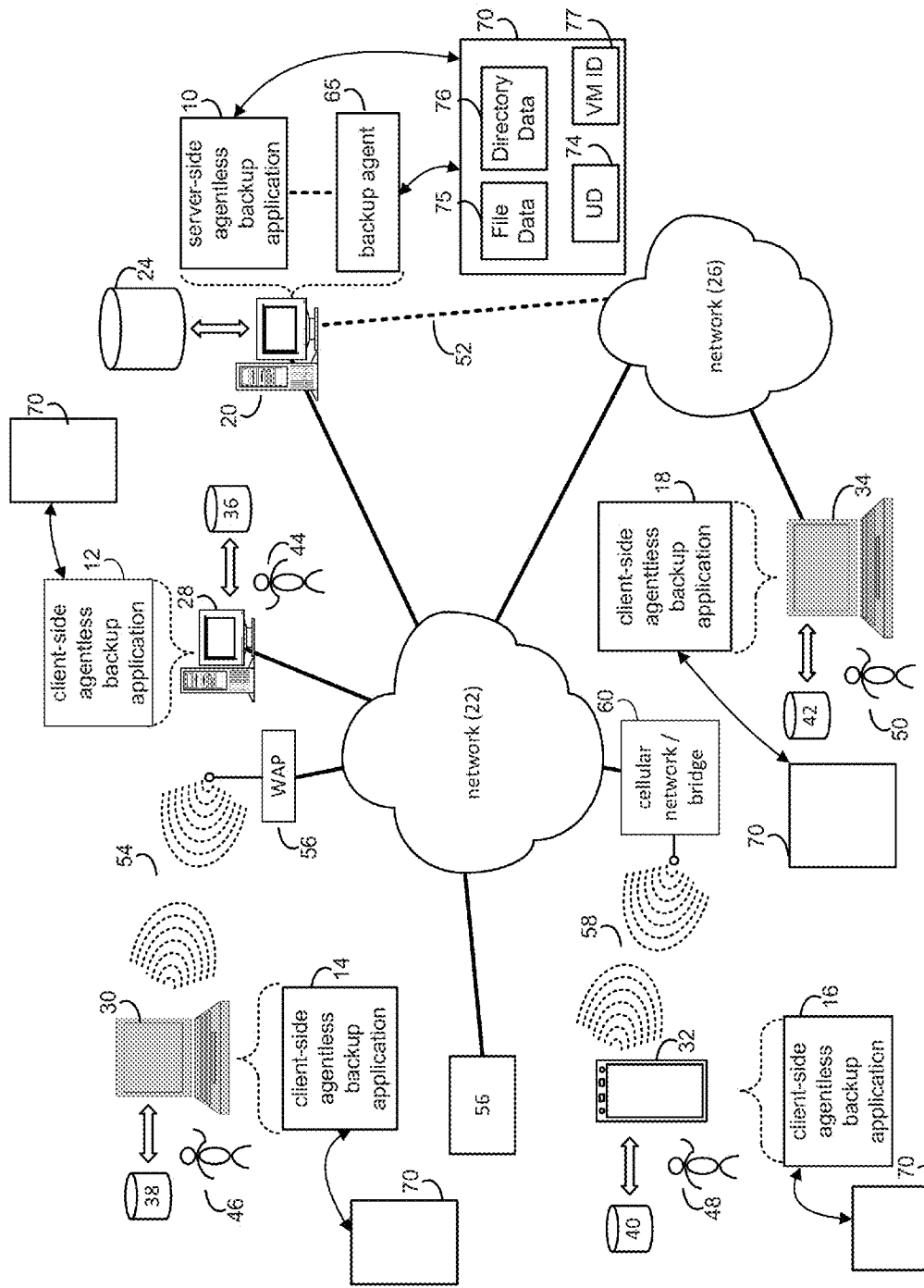
FIG. 1A depicts an example system that can execute implementations of the present disclosure relating to user specified backups of virtual machine files and directories.

A cloud provider may institute backup and recovery procedures to ensure persistence of a tenant's applications, data, or other resources accessed through one or more virtual machines ("VM"). For example, a backup archive of the VM may be created and stored onsite or offsite. In part, the disclosure provides for a backup agent that includes or communicates with a user interface to select a subset, which may include the entire content of the VM before it failed, but more typically includes a group of files and/or directories specified by the user via the user interface. The user interface is typically a graphical user interface suitable to receive indications from the user regarding which files, directories, or other data to backup with regard to a given virtual machine. The identification or ID of which virtual machine to backup up can also be specified using the interface.

Depending on the applications it is running and the transactions it is performing, a given VM's state changes overtime. Virtualization software includes features by which snapshots can be taken of the VM to capture its state at a point in time. A snapshot system can be implemented using hardware and software to monitor a VM and generate snapshots upon user requests or on a schedule. A snapshot can be created using a hypervisor or a software routine or executable in communication therewith, a data storage (where VMs reside) may include one or more snapshot creating software-based routines or executables, one or more software executables or routines that operate on or exchange data with a host (such as for example, a disk drive level filter such as a vSCSI filter with one or more data processing or routing components), or other software or hardware based implementations. The snapshot records the state of the VM so that it can be reverted to at a later time. The snapshot can include the state of the disks or other storage associated with the VM and other state features such as whether it is on, off, or suspended. A VM snapshot may be used as a checkpoint for the VM. The snapshot is created for a point in time and all subsequent write operations are then sent to memory storage such as a virtual disk associated with the VM. To revert back to the checkpoint in time, the VM state is read from the snapshot and the other writes which are backed up to memory storage are also read. In some virtualization software platforms only one active snapshot is possible with each snapshot replacing any prior snapshot. Snapshots have various uses, such as a way to have a VM state to return to prior to testing some potentially unstable applications on the VM.

In some situations, a snapshot feature may be used to create a backup of the VM. The snapshot feature may halt any changes to a virtual disk (i.e., the virtual disk that stores all the VM contents) such that the virtual disk may be copied for backup. Any changes attempted to be made to the virtual disk while the virtual disk is being copied for backup may be written to a snapshot file. Thus, the virtual disk can be backed up during a time when its content does not change. Copying the virtual disk may be time consuming and it may be necessary to keep the snapshot file alive during the entire backup. As such, performance of the VM may be affected during the backup. The ability for a user to select a subset of the contents of a VM and ignore underlying system and support files not created by or relevant to the user allows backup to be completed faster, because there is no need to transfer all data of backed up VM.

In some situations, an agent may be installed in a guest operating system (OS) of the VM to facilitate the backup process. Installing an agent in the guest (OS) of the VM may also affect VM performance and negatively impact services provided by the VM. According to one embodiment of the disclosure, an agentless implementation is used in which an agent, such as a backup agent, for example, is not installed in the VM. In one embodiment, no back up agent is installed in the guest (OS) of the VM.

Thus, using a guest OS agent to create a backup may ultimately slow the VM down and negatively impact the services provided by the VM. The VM may become unresponsive during snapshot deletion or consolidation and may cause VM services to malfunction. Because may backup solutions are based on snapshot features, there may be a need for a system that reduces a snapshot file's lifetime or eliminates the need for the snapshot during backup. Further, there may be a need for a system that does not use a guest OS agent to facilitate backup. In various implementations, the techniques and features described in the present disclosure are directed towards systems and methods for agentless VM backup which may allow for better performance and resource usage during VM backups. The techniques and features described herein may also be implemented without use of a guest OS agent to facilitate backup.

Referring to FIG. 1A, there is shown a server-side agentless backup application 10 and client-side agentless backup applications 12, 14, 16, and 18. Server-side agentless backup application 10 and/or one or more of client-side agentless backup applications 12, 14, 16, and/or 18 may execute one or more processes configured to carry out one or more of the features described herein. Server-side agentless backup application 10 may be referred to as a process configured to carry out one or more of the features described herein, such as agentless backup process 10. Further, one or more of client-side agentless backup applications 12, 14, 16, and 18 may be referred to as a process configured to carry out one or more of the features described herein, such as agentless backup processes 12, 14, 16, and/or 18.

Figure 3:
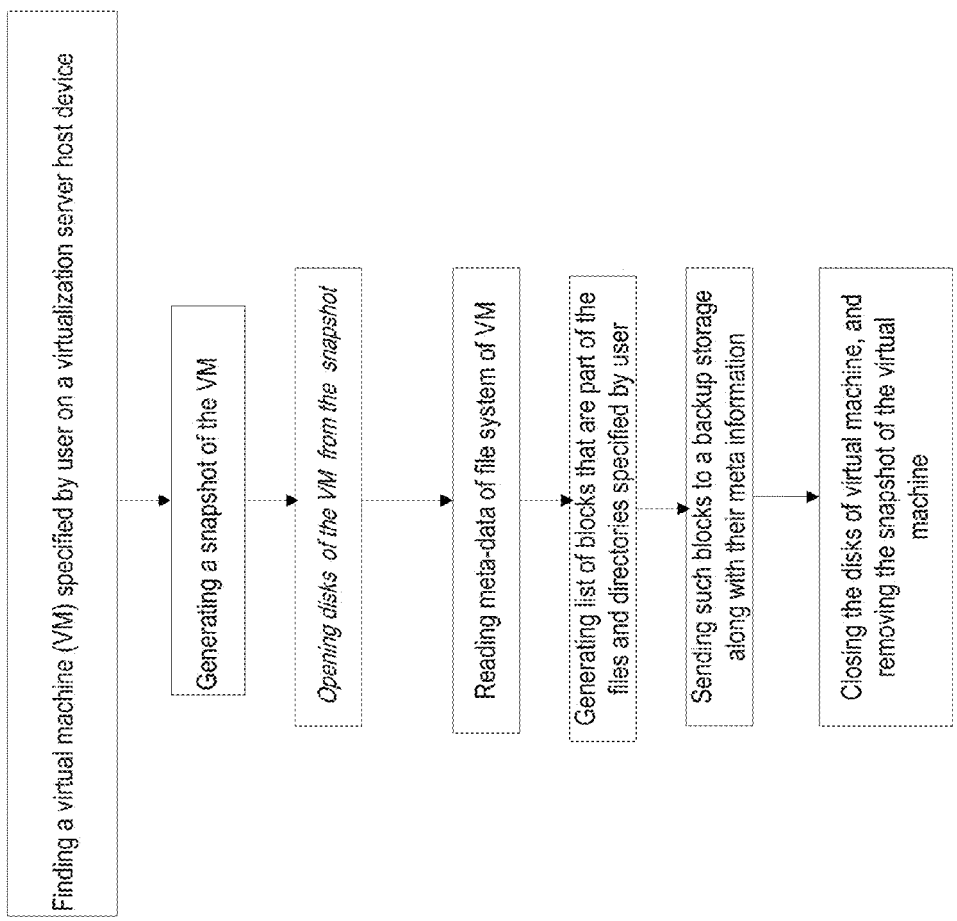
FIG. 3 is a flowchart illustrating an example process for agentless virtual machine backup in accordance with the present disclosure.

As will be discussed below and with regard to FIGS. 3 and 4 and otherwise herein, agentless backup process 10 may find a virtual machine specified by user on a virtualization server host device. The backup agent may run outside of the virtual machine. The virtual machine may be hosted by a virtualization host device. Agentless backup process 10 may also identify via the backup agent, a virtual disk associated with the virtual machine indicated to be backed up (i.e., the source VM) and a location of the virtual disk based upon, at least in part, a virtual disk identifier. Agentless backup process 10 may further generate a snapshot of the virtual machine. Agentless backup process 10 may additionally read meta-data of file system of virtual machine. Moreover, agentless backup process 10 may generate list of blocks that are part of the files and directories specified by user. The agentless backup process may send such blocks to a backup storage along with their meta information. In addition, the agentless backup process 10 may close the disks of virtual machine, and removing the snapshot of the virtual machine.

The agentless backup process may be a server-side process (e.g., server-side agentless backup process 10), a client-side process (e.g., client-side agentless backup process 12, client-side agentless backup process 14, client-side agentless backup process 16, or client-side agentless backup process 18), or a hybrid server-side/client-side process (e.g., a combination of server-side agentless backup process 10 and one or more of client-side agentless backup processes 12, 14, 16, 18).

System Overview

Referring to FIG. 1A, server-side agentless backup process 10 may reside on and may be executed by server computer 20, which may be in communication with network 22 (e.g., the Internet or a local area network). Examples of server computer 20 may include, but are not limited to: a personal computer, a server computer, a series of server computers, a mini computer, and/or a mainframe computer. The server computer 20 may be a distributed system and the operations of server computer 20 may execute on one or more processors, simultaneously and/or serially. For example, server computer 20 may be a symbolic representation of a cloud computing site, cloud environment, or cloud platform running multiple servers, computers, or virtual machines (e.g., a virtual machine or virtualization host computer). Server computer 20 may execute one or more operating systems, examples of which may include but are not limited to: Microsoft Windows Server™; Novell Netware™; Redhat Linux™, Unix, or a custom operating system, for example.

The instruction sets and subroutines of server-side agentless backup process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a solid state storage device; a RAID array; a random access memory (RAM); and a read-only memory (ROM).

Server computer 20 may execute a web server application that allows for access to server computer 20 (via network 22) using one or more protocols, examples of which may include but are not limited to HTTP (i.e., HyperText Transfer Protocol). Network 22 may be in communication with one or more secondary networks (e.g., network 26), examples of which may include but are not limited to: a local area network; a wide area network; or an intranet, for example.

Client-side agentless backup processes 12, 14, 16, 18 may reside on and may be executed by client electronic devices 28, 30, 32, and/or 34 (respectively), examples of which may include but are not limited to personal computer 28, a television with one or more processors embedded therein or coupled thereto (not shown), laptop computer 30, data-enabled mobile telephone 32, notebook computer 34, a tablet (not shown), and a personal digital assistant (not shown), for example. Client electronic devices 28, 30, 32, and/or 34 may each be in communication with network 22 and/or network 26 and may each execute an operating system, examples of which may include but are not limited to Apple iOS™, Microsoft Windows™, Android™, Redhat Linux™, or a custom operating system.

The instruction sets and subroutines of client-side agentless backup processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; solid state storage devices; RAID arrays; random access memories (RAM); read-only memories (ROM); compact flash (CF) storage devices; secure digital (SD) storage devices; and memory stick storage devices.

Client-side agentless backup processes 12, 14, 16, 18 and/or server-side agentless backup process 10 may be processes that run within (i.e., are part of) a cloud computing site, cloud computing application, cloud platform, or cloud environment. Alternatively, client-side agentless backup processes 12, 14, 16, 18 and/or server-side agentless backup process 10 may be stand-alone applications that work in conjunction with the cloud computing site, cloud computing application, cloud platform, or cloud environment. One or more of client-side agentless backup processes 12, 14, 16, 18 and server-side agentless backup process 10 may interface with each other (via network 22 and/or network 26).

Users 44, 46, 48, 50 may access server-side agentless backup process 10 directly through the device on which the client-side agentless backup process (e.g., client-side agentless backup processes 12, 14, 16, 18) is executed, namely client electronic devices 28, 30, 32, 34, for example. Users 44, 46, 48, 50 may access server-side agentless backup process 10 directly through network 22 and/or through secondary network 26. Further, server computer 20 (i.e., the computer that executes server-side agentless backup process 10) may be in communication with network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing a wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and personal digital assistants to be interconnected using a short-range wireless connection.

Agentless Virtual Machine Backup Process

In part, the disclosure relates to a method, computer program product, computing system, and systems for virtual machine backup are described that facilitates the backup of selective VM data rather than a backup of the entire VM. In part, the disclosure relates to methods and systems for performing backup of virtual machine files on a block level that include features that allow a user to select and backup specific files or folders of file systems of a VM. The specificity and selectivity features by which certain files or folders are archived from a file system of a VM can be implemented by processing one or more partition structures of a virtual disk of a virtual machine. Once the partition structures have been processed and analyzed using a backup up software application, it is then possible to detect and process guest file systems of the VM.

Each VM includes various types of system data and other non-critical data examples of these include files of operating systems, applications, temporary files, and other files. The VM also includes data that is critical to the user such as user created files, customer files, and other data generated in the VM for objectives of interest to the user. The non-critical data or support data can be 95% of all data in the system (especially in virtual environments). From a backup administrator's point of view, this data is of low value or irrelevant from a back up and recovery standpoint. Accordingly, copying the contents of an entire VM, the majority of which is non-critical data, is not an efficient allocation of computing and storage resources.

In part, the disclosure relates to methods and systems by which critical data, such as data of interest to a user or administrator of a backing up necessary files only instead of the whole virtual machine should allow significantly decrease size of backed up data, and minimize time required for performing backup.

For the following discussion, server-side agentless backup process 10 will be described for illustrative purposes. It should be noted that server-side agentless backup process 10 may interact with client-side agentless backup process 12 and may be executed within one or more applications that allow for communication with client-side agentless backup process 12. However, this is not intended to be a limitation of this disclosure, as other configurations are possible (e.g., stand-alone, client-side agentless backup processes and/or stand-alone server-side agentless backup processes). For example, some implementations may include one or more of client-side agentless backup processes 12, 14, 16, 18 in place of or in addition to server-side agentless backup process 10.

The systems and methods (e.g., agentless backup process 10) described herein relate to the backup of data in a virtualized environment. In part, the systems and methods relate to decreasing or eliminating the time period for keeping a snapshot of a virtual machine while it is being backed up. The techniques and features described herein may reduce the backup time period for the VM or decrease or eliminate the time during which services supported by the VM are unavailable or negatively impacted during a VM backup when compared to using a guest OS agent.

The systems described herein may include one or more memory elements for backup of software and databases, virtual machines, and computer storage products including instructions to be executed by a processor to cause the processor to implement the methods described herein. The systems described herein may also include a backup archive, where the VM backup file, backup archive file, or backup contents may be located; the backup archive may be disposed in a memory, a portion of a memory, or across one or more memories.

Referring now to FIG. 1A, one or more of users 44, 46, 48, and 50 may be cloud administrators at a cloud provider or may be cloud end-users. The cloud administrators may access and administer cloud a computing site and the cloud-end users may access and interact with the cloud computing site through one or more of client electronic devices 28, 30, 32, 34 (respectively). The cloud computing site may run a cloud or virtualization application such as VMWare™ or may include bare-metal embedded hypervisors (e.g., VMware™ ESX™ and VMware™ ESXi™) that may run directly on server hardware at cloud computing site 20. Further, the cloud computing site may include a vCloud™ architecture that may enhance cooperation between hypervisors.

Figure 1B:
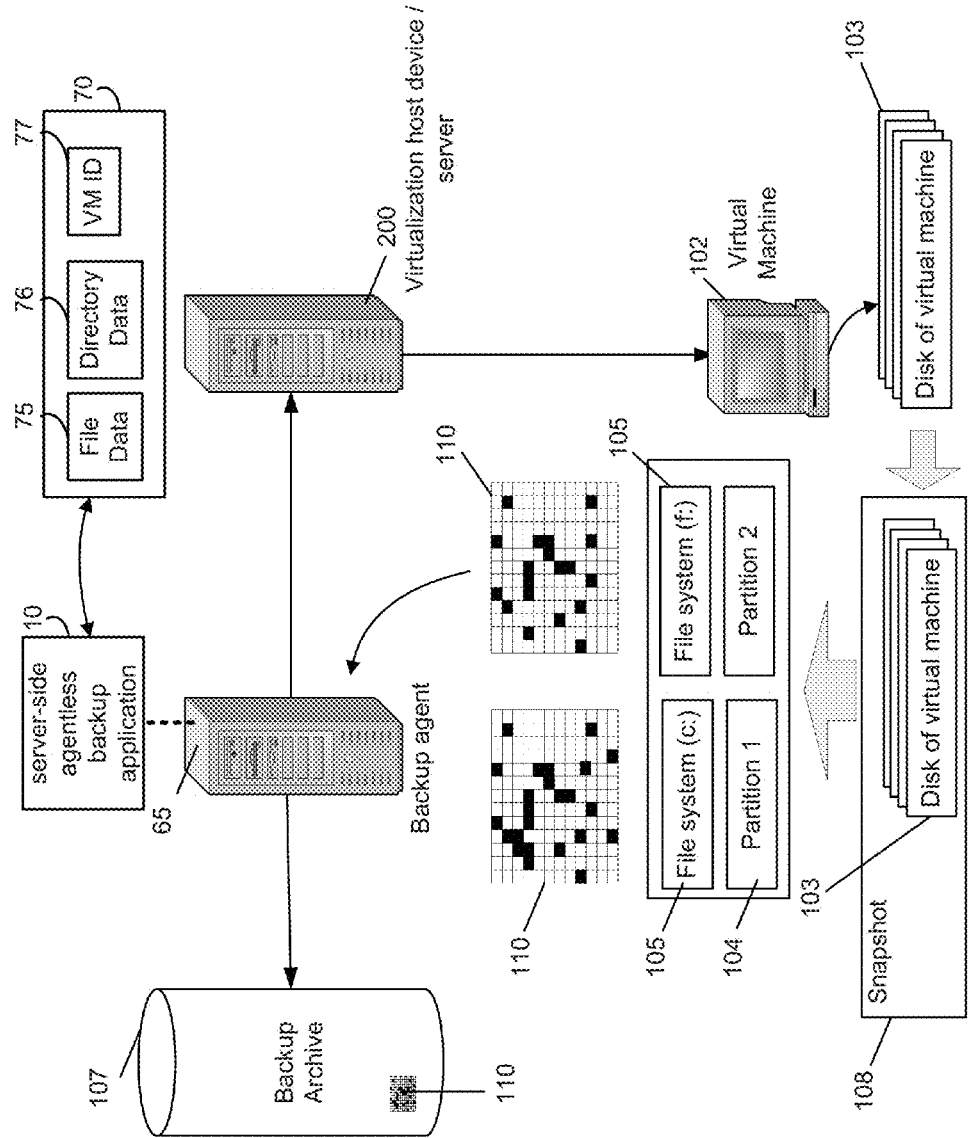
FIG. 1B depicts an example system that can execute implementations of the present disclosure relating to user specified backups of virtual machine files and directories.
Figure 2:
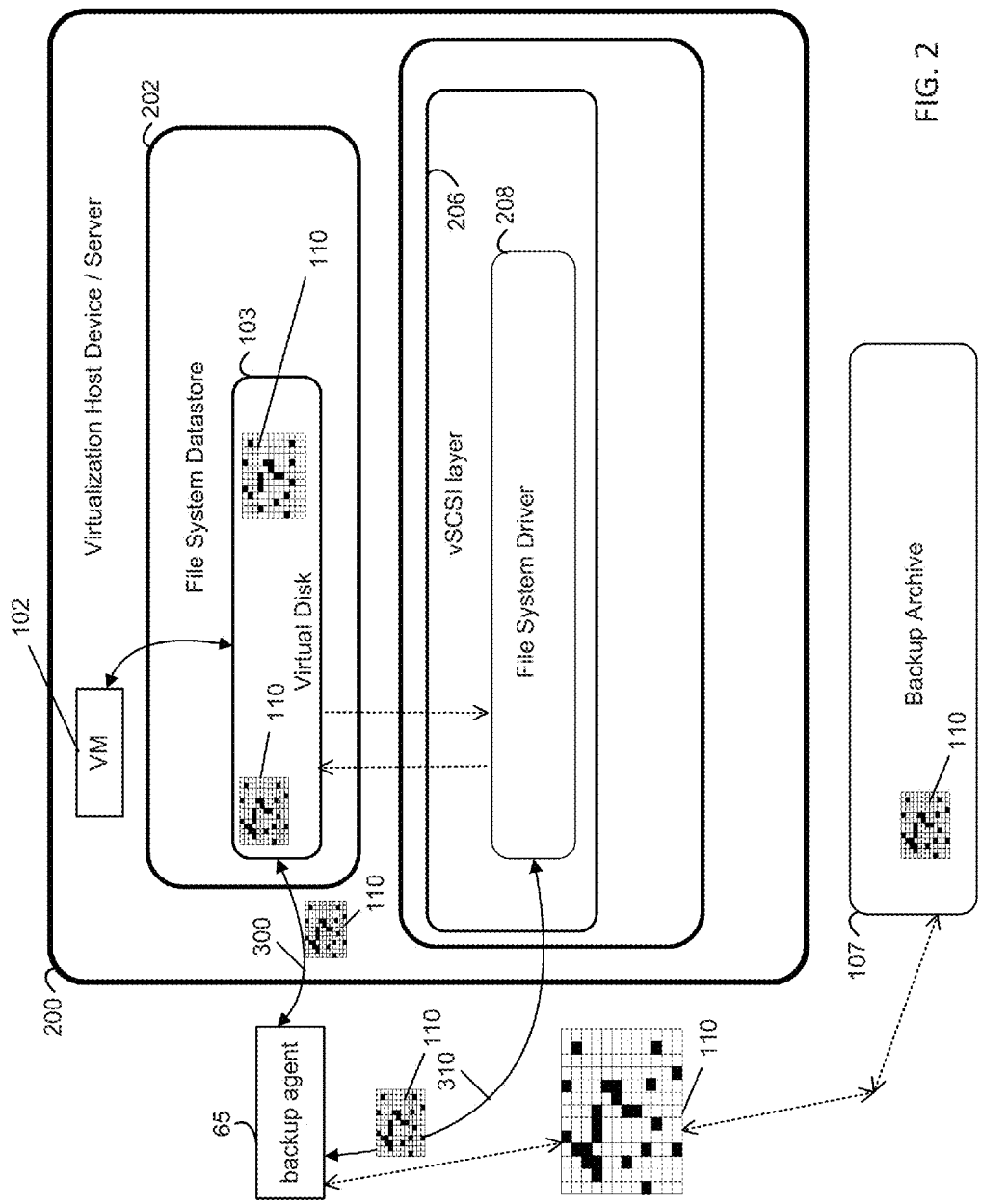
FIG. 2 depicts an example infrastructure in accordance with the present disclosure

Referring now to FIGS. 1B and 2, the cloud computing site may include one or more virtualization host machines such as virtualization host 200 (e.g., a virtual machine host computer). Virtualization host 200 may be a server computer on which a hypervisor runs one or more virtual machines. Virtualization host 200 may be an ESXi host and may run the VMware™ ESXi™ hypervisor. Virtualization host 200 may use a cluster file system such as Virtual Machine File System (VMFS) or a Network File System (NFS).

For example, virtualization host 200 may include file system datastore 202, which may be based on VMFS. Datastore 202 may include one or more virtual disks such as virtual disk 103, which may be a virtual machine disk (VMDK or .vmdk) file. Virtual disk 103 may be a single disk file including the constituent data for an entire virtual machine. File system datastore 202 may be a logical representation of the storage provided by virtualization host 200. Physically, file system datastore 202 may be located on a non-virtual SCSI device in communication with virtualization host 200.

Virtualization host 200 may also include a virtual small computer system interface layer (vSCSI layer 206). vSCSI layer 206 may be a subsystem of virtualization host 200 which may enable running a vSCSI filter or file system driver on virtualization host 200. For example, file system driver 208 may be implemented with vSCSI layer 206 and may be configured to act as a transport layer to send (non-virtual) SCSI data to a virtual machine (VM). The VM can then act or operate on the SCSI data and can capture read and write operations sent through the vSCSI file system driver. File system driver 208 may be installed into virtualization host device 200 (e.g., into a service console).

Small computer system interface or (SCSI) may be a standard that defines how computers can communicate with other devices, such as printers, scanners, and storage devices. By using SCSI, computers can send and receive information to and from other SCSI devices. Similarly, a vSCSI layer such as vSCSI layer 206 may enable a virtual machine to communicate with SCSI devices. For example, vSCSI layer 206 may allow a virtual machine running on virtualization host 200 to communicate with backup archive 107, which may reside on a SCSI device such as a physical storage disk or drive.

File system driver 208 may be a low-level file system driver or vSCSI filter which may act as a transport layer to send SCSI data to a VM. The VM may then act or operate on the SCSI data. File system driver 208 may be installed on virtualization host 200 (e.g., on vSCSI layer 206) and may allow for high performance reading and writing of SCSI blocks (i.e., data) from virtual disk 103, which may be locked. File system driver 208 may be configured to capture input, output, read, or write requests to and from virtual disk 103. File system driver 208 may be installed into virtualization host 200 on vSCSI layer 206. Further, File system driver 208 may be configured to emulate vSCSI controllers for virtual machines and may work with VMFS partitions and .vmdk files or disks thereon.

Virtualization host 200 may include or be in communication with one or more agents. For example, virtualization host 200 may have one or more agents installed on it, such as backup agent 65. Backup agent 65 may reside and/or run on server computer 20 and may carry our one or more features of agentless backup process 10. As shown in FIGS. 1A and 1B, the backup agent 65 may include or be in communication with a user interface 70. This user interface receives user inputs and sends control signals that include information relating to which VM should be backed up, which file data should be backed up, which directories should be backed up, and other user selected information. The user interface 70 can receive user selections and inputs relating to file data 75, directory data 76, VM IDs 77, other user data 74 and other controls and selections relating to VM backup and arching. The outputs of the user interface are generated in response to the user inputs and are used by the backup agent 65 and/or the agentless backup application 10.

Backup agent 65 may include software component, executable code, function, subroutine, or other set of instructions designed to carry out one or more operations for agentless backup of one or more virtual machines running on virtualization host 200. Backup agent 65 may run on virtualization host 200 as a virtual appliance. Additionally, virtualization host 200 may be in communication with backup archive 107, which may include virtual machine backup data or backup archive files of one or more virtual machines running on virtualization host 200. Backup archive 107 may reside on a physical or virtual storage device.

In an embodiment, backup agent 65 may include one or more executables which handle interaction and coordination between the backup archive 107, virtualization host 200, file system driver 208, and a user (through, for example, a web interface). For example, backup agent 65, which may run on server computer 20, may receive one or more inputs which may be one or more commands from an end-user (entered via, e.g., a web interface accessed at one or more of client electronic devices 28, 30, 32, or 34). Further, backup 65 agent may output commands which may be transmitted to one or more of virtualization host 200, file system driver 208, and backup archive 107.

One or more backup agents 65 may coordinate the agentless backup process. Backup agent 65 may require a separate machine where it can be run. This machine may be, for example, a virtual appliance, a Windows/Linux virtual machine, or a Windows/Linux physical machine, where the executable code of backup agent 65 can be executed. Backup agent 65 may generally be active during the whole agentless backup procedure. Backup agent 65 may generally be in communication with virtualization host 200 throughout the agentless backup process (e.g., agentless backup process 10).

Referring now also to FIG. 1B, agentless backup process 10 may receive via backup agent 65, an indication of a files, user data, and/or directories of a virtual machine to be backed up in a backup archive file (e.g., to reside in backup archive 107). The backup archive file may be created by agentless backup process 10 in response to receiving the indication. Backup agent 65 may be installed or may run outside of the virtual machine (e.g., at server computer 20) and outside virtualization host device 20. The virtual machine may be hosted by virtualization host device 200.

Virtualization host device 200 may be a source preconfigured ESX(i) host which may host one or more virtual machines that at some point may need to be backed up. The indication of the data or directories to be backed up may be received from, e.g., a user entering a command into a web interface at server computer 20 or one or more of client electronic devices 28, 30, 32, or 34 or user interface 70. For example, one or more of users 44, 46, 48, and 50 may be system administrators of a cloud computing site and may wish to backup one or more virtual machines hosted by virtualization host device 200.

In an embodiment, in response to receiving the indication or selection of the user specified data to be backed up (i.e., the source virtual machine), backup agent 65 may initiate agentless backup process 10. Agentless backup process 10 may identify via backup agent 65, virtual disk 103 which may be associated with the virtual machine indicated to be backed up and a location of virtual disk 103 based upon, at least in part, a virtual disk identifier. Virtual disk 103 may include the contents of the virtual machine such that the user selected data can be backed up as a subset of such contents. Further, agentless backup process 10 may implement one or more of the process flow steps described herein including with respect to FIG. 3 and FIG. 4.

FIG. 1B illustrates one embodiment of a system for performing an agentless file backup of a virtual machine. The system includes a backup agent 65 configured to transfer backup data such as blocks of data extracted from a VM snapshot to a backup repository 107. The backup agent 65 can include a hardware system, a software system, or any combination thereof. The backup agent 65 is operable to communicate with a virtualization host device such as a virtualization server 200 that is configured to host one or more virtual machines 102. A virtual machine 102 includes one or more virtual disks 103.

The backup agent 65 is further configured to identify and transfer certain blocks of data from a snapshot of virtual machine 102 based on user selectable criteria and generate an archive of such blocks from that snapshot 108 as described in further detail below. The snapshot 108 includes the virtual disks 103 of the virtual machine 102 at the time the snapshot 108 was taken. The virtual disks 103 include one or more partitions 104. The partitions 104 may include one or more file systems 105. The file systems 105 further include blocks of data 106 that can be system data or user data.

Figure 4:
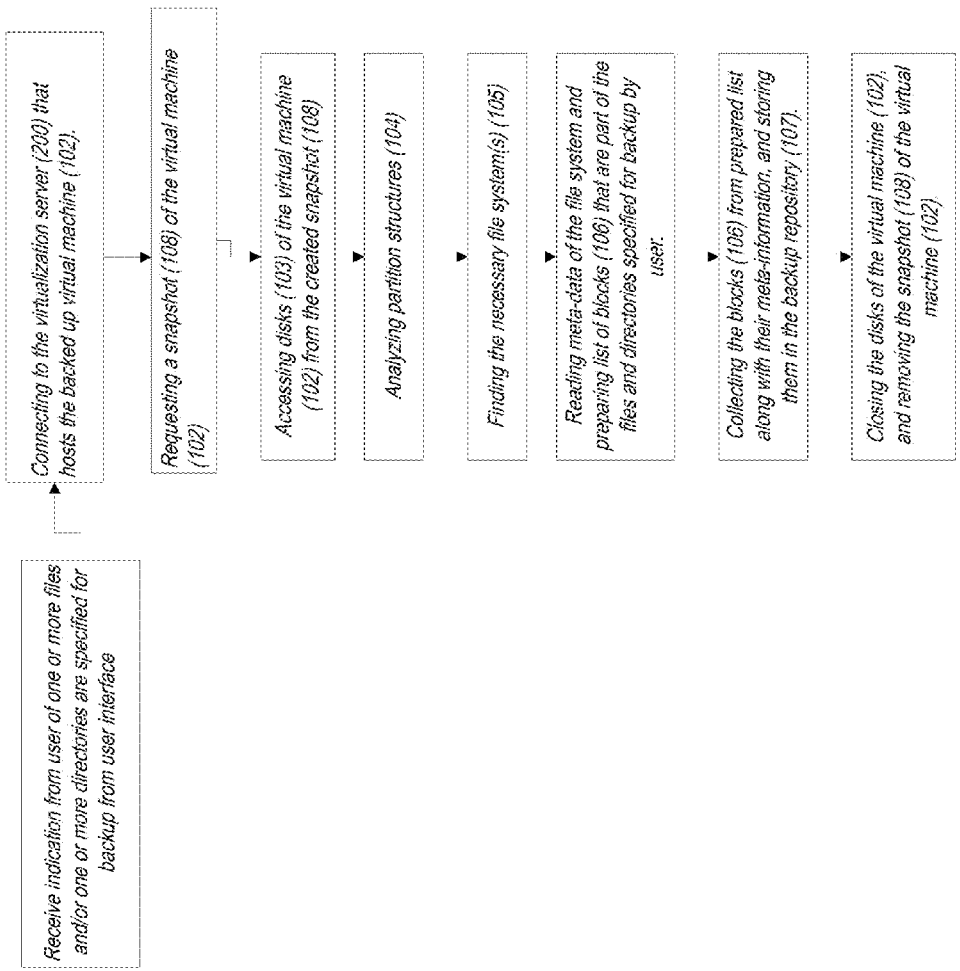
FIG. 4 is a flowchart illustrating an example process for agentless virtual machine backup in accordance with the present disclosure.

FIG. 4 illustrates one embodiment of a process for an agentless file backup of a virtual machine. The backup agent 65 may receive an indication from user of one or more files and/or one or more directories that are specified for backup from user interface. The backup agent 65 can be configured to establish a connection to the virtualization server 200 that hosts one or more virtual machines 102 that will be backed up. The backup agent 65 can be configured to request snapshot 108 of the virtual machine 102 that it is going to be backed up. The requested snapshot 108 can be generated using a Volume Snapshot Service, or any other integration tools available to the virtual operating system that will consistently capture the data. Generating a snapshot 108 may require freezing or halting the virtual machine 102, or putting the virtual machine 102 into a quiescent, that is, idle or non-operative state. This operation can be conducted by the virtual machine 102 or by the backup agent 65 or driver 208.

As shown in FIGS. 4 and 1B, the snapshot 108 will contain images of the virtual disks 103 of the virtual machine 102. The backup agent 65 can be configured to open the virtual disks 103 from the snapshot 108. The backup agent 65 further can be configured to analyse the partition 104 structures of the virtual disks 103 and locate any file systems 105 contained therein such as a c: drive directory, a f: drive directory, or other file systems for the guest OS. The backup agent 65 can further be configured to read the metadata of the file systems 105 and identify which blocks 106 are to be backed up. The backup agent 65 can be configured to determine which blocks are system data and which blocks are user data. The backup agent 65 can be configured to back up system data or user data, or both.

As shown in FIG. 2 the backup agent 65 can transfer block data 110 corresponding to data selected by the user for archiving using user interface 70. The backup agent can communicate with and send or receive data with virtual disk 103 directly along bi-directional data path 300 to perform one or more steps identified herein such as in FIG. 3 and FIG. 4. This can be used to move blocks of data to and from archive 107. The backup agent can communicate with and send or receive data with virtual disk 103 through file system drive 208 along bi-directional data path 310 to perform one or more steps identified herein such as in FIG. 3 and FIG. 4. Thus, drier 208 can be used to move blocks of data to and from archive 107. The blocks of data 110 extracted from the snapshot based on user preferences can be moved to and from the virtual disk 103 along the various paths shown.

Furthermore, a user can specify specific files and/or directories that to back up, thus the backup agent 65 can use this information to further differentiate the blocks 106 from a file system 105. Upon identifying which blocks 106 from a file system 105 are data that is to be backed up, the backup agent 65 can configured to collect these blocks 106 along with their meta-information and store them in the backup repository 107. The backup agent can further be operable to close the virtual disks 103 and remove the snapshot 108.

The backup repository 107 can be used to recover data in any number of ways as shown in FIG. 2 and as otherwise described herein. For example, the files can be restored from the backup archive 107 and then copied to an existing virtual machine using the virtual machine's API that allows one to manipulate files within operating systems running on the virtual machine. Alternatively or additionally, the files can be restored to a user-specified location, such as for instance the network shares drives,] on the original virtual machine or on another virtual machine.

Additionally or alternatively, the files can be restored to the original virtual machine 102 using various methods. For example, the VM backed up files can be restored using a virtualization infrastructure API such as the VIX API or a SOAP API to copy files to one or more VMS. Recovering files to the original virtual machine using file system driver 208 is also one option. This driver can also be used to help identify and transfer the relevant blocks 110 to archive 107. The driver 208 is configured, in one embodiment, to allow saving data directly to the original machine disks. Example Software and Hardware Related Implementations A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof.

Various embodiments of the systems and methods may include and/or utilize a computer device. In various embodiments, a computer may be in communication with a server or server system utilizing any suitable type of communication including, for example, wired or wireless digital communications. In some embodiments, the server or server system may be implemented as a cloud computing application and/or in a similar manner and may provide various functionality of the systems and methods as SaaS.

The examples presented herein are intended to illustrate potential and specific implementations of the present invention. The examples are intended primarily for purposes of illustration of the invention for those skilled in the art. No particular aspect or aspects of the examples are necessarily intended to limit the scope of the present invention.

The figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present invention, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," "computer device," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, or HTML using, for example, conventional or object-oriented techniques. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. As the systems and methods described herein aim to minimize I/O transactions, they may be useful in situations, such as cloud computing configurations, where I/O transactions are performed over a WAN or other network with long I/O delays. The network may use routers and/or public communication links. One type of data communication network may cover a relatively broad geographic area (e.g., city-to-city or country-to-country) which uses transmission facilities provided by common carriers, such as telephone service providers.

In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier or other data location information as described herein). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java).

Also, application servers may be provided in accordance with the .NET framework, including the Windows Communication Foundation, .NET Remoting, ADO.NET, and ASP-.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the disclosure can be realized as one or more computer program products, i.e., one or more modules of computer program instructions encoded on a computer readable medium for execution by, or to control the operation of, a data processing apparatus. The computer readable medium can be a machine-readable storage device, a machine readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions or computer program products and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These may also be referred to as computer readable storage media. The processor and the memory can be supplemented by, or incorporated in, special purpose logic circuitry.

To provide for interaction with a user, implementations of described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

While various embodiments have been described herein, it should be apparent, however, that various modifications, alterations and adaptations to those embodiments may occur to persons skilled in the art with the attainment of some or all of the advantages of the invention. The disclosed embodiments are therefore intended to include all such modifications, alterations and adaptations without departing from the scope and spirit of the invention. Accordingly, other embodiments and implementations are within the scope of the following claims. For example, the actions recited in the claims can be performed in a different order and still achieve desirable results.

What is claimed is:

1. A method comprising:
   creating a snapshot of a virtual machine hosted at a virtual machine server;
   opening, from the created snapshot, one or more disks of the virtual machine, the one or more disks including files selected for backup, wherein the files selected for backup exclude non-critical data from the one or more disks of the virtual machine, the non-critical data including at least one of operating system files, application files, and temporary files;
   identifying, based upon, at least in part, file system metadata associated with the one or more disks, one or more blocks of the one or more disks, the one or more blocks corresponding to the files selected for backup;
   storing the one or more blocks and metadata corresponding to the one or more blocks in a backup repository; and
   closing the one or more disks of the virtual machine and removing the snapshot.

2. The method of claim 1, further comprising:
   identifying one or more file systems associated with the files selected for backup based upon, at least in part, one or more file system partition structures of the one or more disks of the virtual machine.

3. The method of claim 1, further comprising:
   receiving an indication of the files selected for backup.

4. The method of claim 1, further comprising:
   establishing communication between the virtual machine server hosting the virtual machine and a separate computing device running a backup agent configured to perform the creating, opening, identifying, storing, and closing operations.

5. The method of claim 1, further comprising:
   recovering the files selected for backup to the virtual machine by, at least in part, copying the one or more blocks from the backup repository to the virtual machine using an application programming interface.

6. The method of claim 1, further comprising:
   recovering the files selected for backup by, at least in part, recovering the one or more blocks from the backup repository to a user specified location accessible to the virtual machine.

7. The method of claim 1, further comprising:
   recovering the files selected for backup to the virtual machine using, at least in part, a file driver configured to save data to the one or more disks of the virtual machine.

8. The method of claim 1, wherein the files selected for backup include user critical data comprising a portion of the one or more disks of the virtual machine.

9. A system comprising:
   a virtual machine hosted at a virtual machine server;
   a backup system configured to:
      create a snapshot of a virtual machine hosted at a virtual machine server;
      open, from the created snapshot, one or more disks of the virtual machine, the one or more disks including files selected for backup, wherein the files selected for backup exclude non-critical data from the one or more disks of the virtual machine, the non-critical data including at least one of operating system files, application files, and temporary files;
      identify, based upon, at least in part, file system metadata associated with the one or more disks, one or more blocks of the one or more disks, the one or more blocks corresponding to the files selected for backup;
      store the one or more blocks and metadata corresponding to the one or more blocks in a backup repository; and
      close the one or more disks of the virtual machine and removing the snapshot.

10. The system of claim 9, wherein the backup system is further configured to:
    identify one or more file systems associated with the files selected for backup based upon, at least in part, one or more file system partition structures of the one or more disks of the virtual machine.

11. The system of claim 9, wherein the backup system is further configured to:
    receive an indication of the files selected for backup.

12. The system of claim 9, wherein the backup system is a backup agent configured to:
    establish communication between the virtual machine server hosting the virtual machine and a separate computing device running the backup agent.

13. The system of claim 9, wherein the backup system is further configured to:
    recover the files selected for backup to the virtual machine by, at least in part, copying the one or more blocks from the backup repository to the virtual machine using an application programming interface.

14. The system of claim 9, wherein the backup system is further configured to:
    recover the files selected for backup by, at least in part, recovering the one or more blocks from the backup repository to a user specified location accessible to the virtual machine.

15. The system of claim 9, wherein the backup system is further configured to:
    recover the files selected for backup to the virtual machine using, at least in part, a file driver configured to save data to the one or more disks of the virtual machine.

16. The system of claim 9, wherein the files selected for backup include user critical data comprising a portion of the one or more disks of the virtual machine.

17. A system comprising:
a virtual machine hosted at a virtual machine server;
a snapshot system that creates a snapshot of the virtual machine; and
a backup agent running at a computing device separate from the virtual machine server that:
opens, from the created snapshot, one or more disks of the virtual machine, the one or more disks including files selected for backup;
identifies, based upon, at least in part, file system metadata associated with the one or more disks, one or more blocks of the one or more disks, the one or more blocks corresponding to the files selected for backup; and
closes the one or more disks of the virtual machine and removes the snapshot; and
a backup repository that stores the one or more blocks and metadata corresponding to the one or more blocks, wherein the snapshot system comprises one or more components selected from the group consisting of a snapshot creating software-based routine; a hypervisor or a software routine or executable in communication therewith; a disk drive level filter; a vSCSI filter and a data storage device that comprises one or more virtual machines; and
a hypervisor or a software routine or executable in communication therewith, a data storage device (where virtual machines reside) comprising one or more snapshot creating software-based routines or executables, one or more software executables or routines that operate on or exchange data with a host (such as for example, a disk drive level filter such as a vSCSI filter with one or more data processing or routing components).

18. The system of claim 17, wherein the files selected for backup exclude non-critical data from the one or more disks of the virtual machine, the non-critical data including at least one of operating system files, application files, and temporary files.

* * * * *